(12) United States Patent
Dias Ferraz

(10) Patent No.: US 8,453,968 B2
(45) Date of Patent: Jun. 4, 2013

(54) SYSTEM FOR RETRACTING AND EXTENDING AIRBORNE SENSORS

(75) Inventor: Mario Sergio Dias Ferraz, São José dos Campos (BR)

(73) Assignee: Embraer S.A., São José dos Campos, SP (BR)

( * ) Notice: Subject to any disclaimer, the term of this patent is extended or adjusted under 35 U.S.C. 154(b) by 542 days.

(21) Appl. No.: 12/594,276

(22) PCT Filed: Mar. 27, 2008

(86) PCT No.: PCT/BR2008/000088
§ 371 (c)(1),
(2), (4) Date: May 7, 2010

(87) PCT Pub. No.: WO2008/119144
PCT Pub. Date: Oct. 9, 2008

(65) Prior Publication Data
US 2010/0219295 A1 Sep. 2, 2010

(30) Foreign Application Priority Data
Apr. 2, 2007 (BR) .................................... 0701237

(51) Int. Cl.
*B64C 1/22* (2006.01)
(52) U.S. Cl.
USPC ...................... 244/118.1; 244/129.1; 244/1 R

(58) Field of Classification Search
USPC ............. 244/1 R, 118.1, 129.1, 172.4–172.6, 244/173.3
See application file for complete search history.

(56) References Cited

U.S. PATENT DOCUMENTS 2,207,084 A 1/1939 Bowers
4,188,631 A * 2/1980 Dougherty et al. ........... 343/705
5,918,834 A 7/1999 Sommer et al.

OTHER PUBLICATIONS

International Search Report for PCT/BR2008/000088 mailed Dec. 3, 2008.
Written Opinion for PCT/BR2008/000088 mailed Dec. 3, 2008.

* cited by examiner

*Primary Examiner* — Timothy D Collins
*Assistant Examiner* — Nicholas McFall
(74) *Attorney, Agent, or Firm* — Nixon & Vanderhye P.C.

(57) ABSTRACT

A retractable optical sensor system includes a sensor body (e.g., an electro-optical/infrared (EO/IR) remote sensor) connected to a sensor support structure that is actuated by an actuator. The sensor support structure accomplishes angular movement whose turning point is located in an end that is mounted to an articulation support. A bulkhead support is fastened to the aircraft structure. The actuator is electrically or hydraulically actuated and has an end united to a support member which is fastened to the aircraft structure. The opposite end of the actuator is connected for articulation to the sensor support structure so as to cause angular movement thereof. Articulation of the sensor support structure causes the sensor body to extend/retract while simultaneously causing the fairing door to be raised/lowered, respectively.

8 Claims, 4 Drawing Sheets

SYSTEM FOR RETRACTING AND EXTENDING AIRBORNE SENSORS

FIELD

The present invention relates to a constructive form for a retractable system applied in aircraft, wherein the system includes a mechanism contained in a protection compartment allowing retraction or extension of a communication/navigation equipment, such as an optical-electronic sensor. The disclosed system presents a constructive disposition that makes possible to guarantee the integrity of the equipment, thereby requiring less space for accommodation, low influence in the air flow passing by the aircraft fuselage and, in consequence, low vibration of the equipment.

BACKGROUND AND SUMMARY

Both civilian and military aircraft sometimes employ various electronic systems which are fundamental for communication activities, navigation and warning (surveillance), such as sensors, antennas and radar. For example, optical sensors on the aircraft may allow the pilot to identify visually specific geographical and/or terrain attributes in low visibility environments. The electronic systems, depending on the purpose and dimensions of the equipments, are allocated in the aircraft belly, disposed externally or in compartments having a specifically designed fairing forming a protuberance on the smooth lines of the aircraft.

The inconveniences of such protuberances reside in the fact of an increase in the aerodynamic drag, which influences directly the fuel consumption, range and speed limit of the aircraft and also promotes in-flight turbulence. Further, generally speaking, the sensors typically present a spherical shape in which surface is located one or more lenses having a circular format in plan. Once such sensors are exposed to airflow, they become susceptible to vibrations due to the detachment of aerodynamic vortexes. It is also known that useful life of the sensors is related to the intensity of the vibrations which are proportional to dynamic pressure and exposure of the sensors to the airflow.

Due the cost of such equipment and its strategic importance during reconnaissance missions, the installation in aircraft is usually made in a way to allow the equipment to be retractable thereby making it possible to expose the equipment only when necessary for use and to retract the equipment when it is not in use.

Among the different types of known retractable systems, the most common are those that execute vertical movement as taught by U.S. Pat. Nos. 3,982,250, 3,656,164, 4,593,288, 5,969,686 and 5,918,834. However, such a vertical movement in turn implicates an interface with the pressurized area of the aircraft or requires a significant protuberance on the exterior side of the fuselage thereby leading to the disadvantages already mentioned.

Other retractable pantographic systems are also known, but the operation kinematics is seen as a complex procedure mainly due to interaction with the articulated doors, which are defined by heavy mechanisms having relatively large physical dimensions responsible for maintaining the compartment closed. One disadvantage of such a system is due to the fact that the relatively large door surfaces generate disturbances in the air flow when they are extended during the flight. As a result, the entire assemblage becomes subject to strong vibrations which in turn causes mechanical wearing of the parts composing the system and damage to the sensors over time.

It is noticed that the previous proposals in this art are replete with disadvantages that induce relatively high costs of operation and maintenance. Thus, one aspect of the present invention is to provide a new technique that minimizes such disadvantages, as well as providing for a smooth curvilinear surface that reduces turbulence and drag in use.

One objective of the present invention is therefore to present a retractable system for aeronautical sensors which is capable of guaranteeing the physical integrity of the equipment.

Another objective of the present invention is to present a retractable system for aeronautical sensors that makes possible exposition and retraction of the electronic equipment starting from a short angular movement.

Another objective of the present invention is to present a retractable system for aeronautical sensors that uses just a single door built in a fairing of the aircraft.

Another objective of the present invention is to present a retractable system for aeronautical sensors which doesn't require exaggerating protuberances on the aircraft fuselage or wing, thus allowing a minimal space for accommodation inside the aircraft.

BRIEF DESCRIPTION OF THE DRAWINGS

The present invention will be briefly described based in an embodiment example represented by the drawings, wherein.

DETAILED DESCRIPTION

The present invention addresses the disadvantages of the previous state of art, through a sensor disposed in an articulated structure, which is movable through an actuator. The system includes a door operatively connected to the sensor and fitted to a channel through a place where the sensor is exposed, so that the movement of the door and the sensor is reduced thereby minimizing adjustment and loose space problems.

Figure 1:
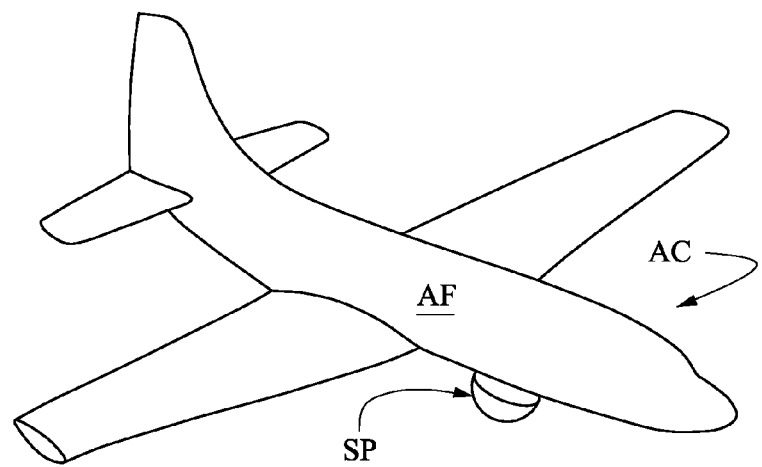
FIG. 1 shows a schematic perspective view of an aircraft having a sensor according to prior art.

FIG. 1 presents a schematic perspective view of an aircraft AC having a sensor pod SP according to previous state of art. As shown, the sensor pod SP is an area with bulbous shape located on the lower portion of the aircraft fuselage AF.

Figure 1B:
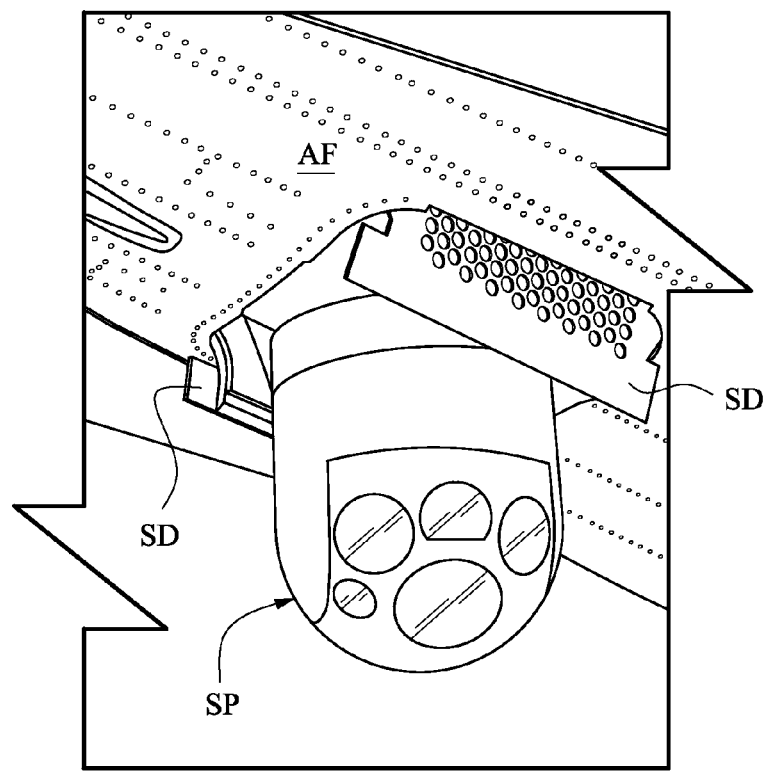
FIG. 1b shows an enlarged schematic perspective view of an infrared optical sensor in an exposed position according to the prior art.

FIG. 1b illustrates in greater detail the sensor pod SP in an exposed position according to previous state of art. As shown in FIG. 1b, the extension and retraction system associated with the conventional sensor pod SP does not have any means that can impede the passage of air to the interior of the fuselage AF when the doors SD are open with the sensor pod SP in an extended position.

Figure 2:
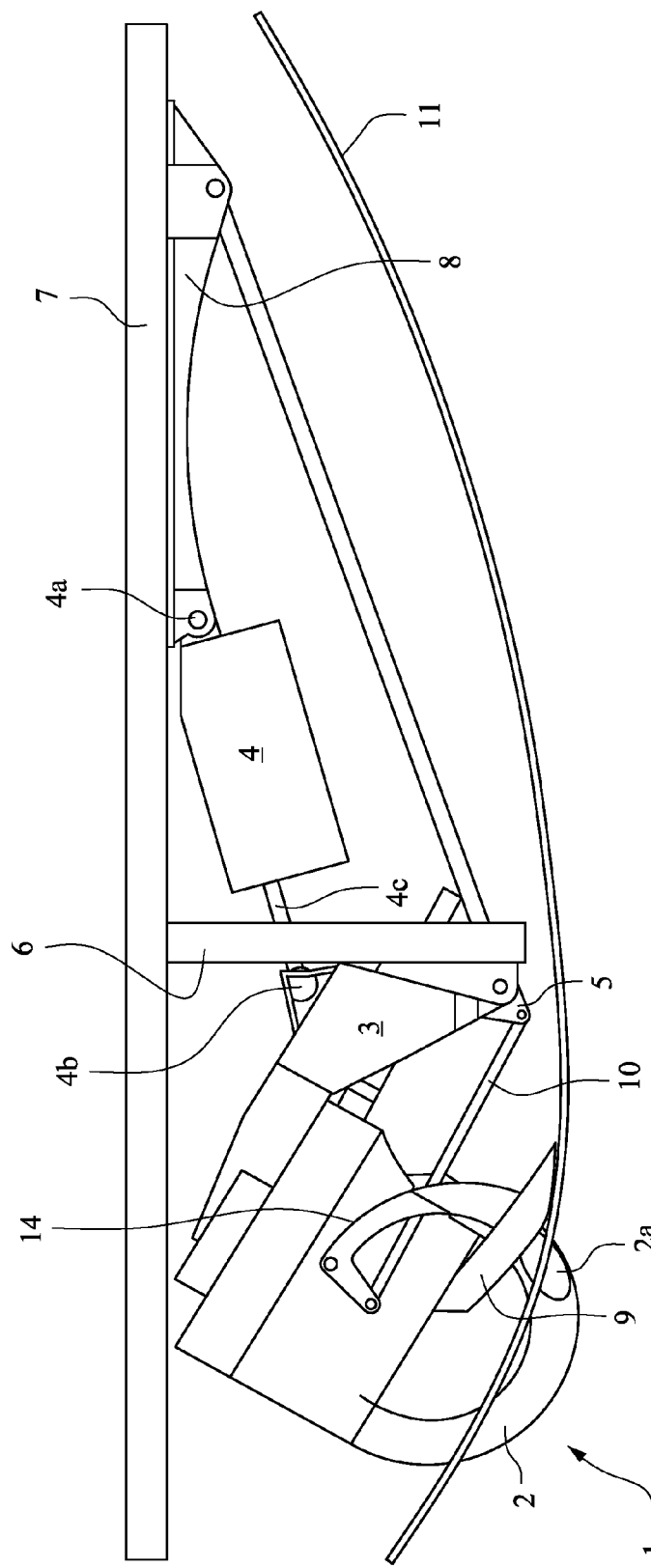
FIG. 2 is a cross-sectional side view of the retractable system for aeronautical sensors according to an embodiment of the present invention in a retracted position.

Accompanying FIG. 2 shows an embodiment of a retractable airborne sensor system 1 according to the present invention which includes an sensor body 2 having an infrared optical sensor 2a or simply EO/IR (Electro-Optical/Infrared Remote) which is assembled to a cantilevered sensor support structure 3 having a substantially trapezoidal profile. The sensor support structure 3 is in turn articulated according to the action of an actuator device 4.

The support structure 3 accomplishes angular movement about a pivot axis located in an end 5a mounted respectively on a bearing or articulation support 5. The articulation support 5 is fastened to a bulkhead support 6 that is perpendicularly fastened to a face of the aircraft fuselage structure 7.

The actuator 4 can be electrically or hydraulically actuated and is pivotally connected at one of its ends 4a to an actuator support member 8 that is fastened to the aircraft structure 7. The opposite end 4b of the actuator 4, specifically the extremity of the piston rod 4c, is articulated in relation to the support structure 3 and it promotes the angular movement of said structure.

A sensor bay door 9 which moves in response to the pivotal movement of the sensor support structure 3 is mounted close to the internal wall of the fairing 11 that protects the system. The movement of the door 9 is limited by a pair of tie rods 10 that interconnect the articulation points of the hinges 14 with the points of the structure 3.

The door 9 is defined by a substantially curved sheet fitting in substantially about one-half of the contour of the circular surface of said sensor body 2.

Figure 3:
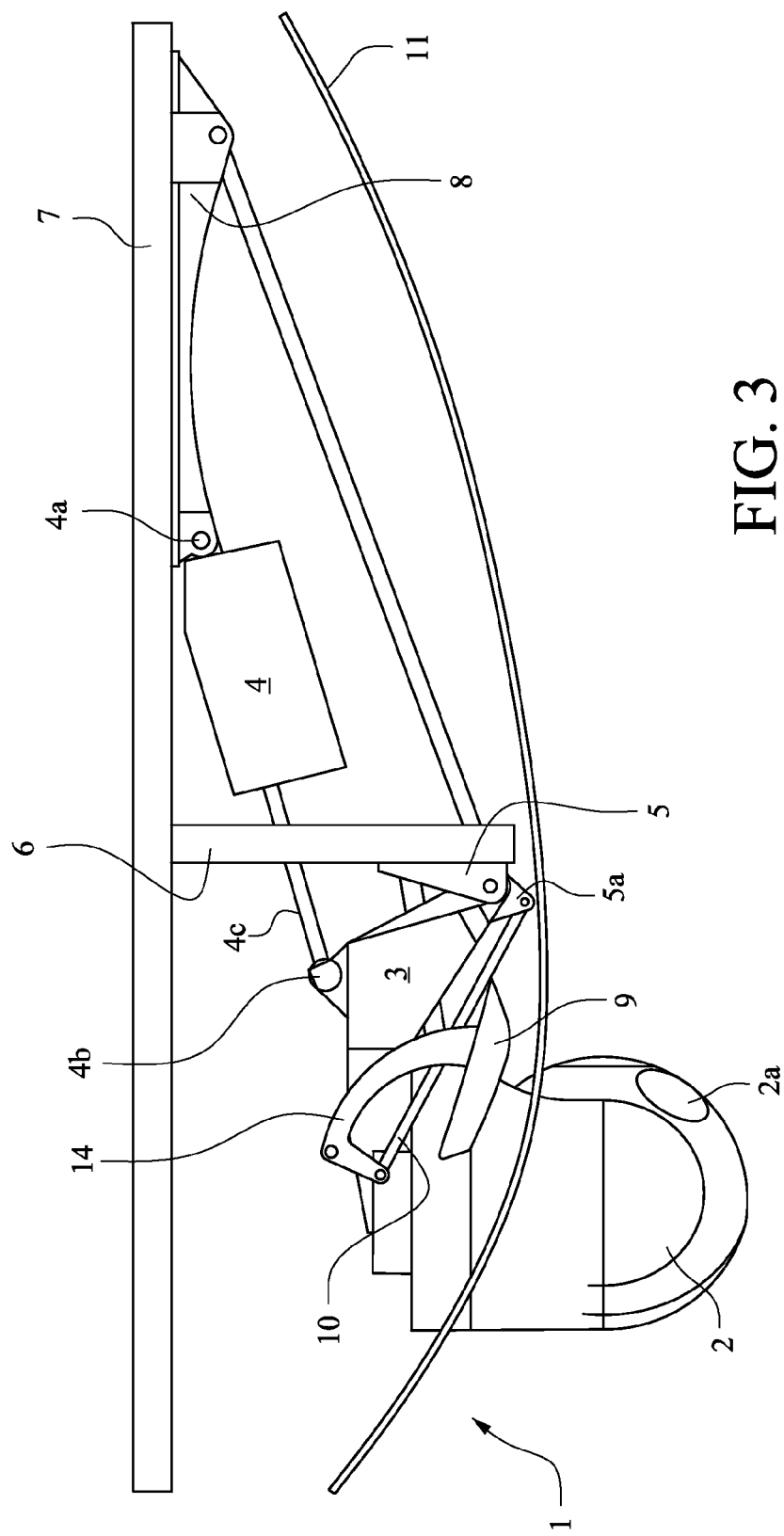
FIG. 3 is a cross-sectional side view of the retractable system for aeronautical sensors according to an embodiment of the present invention in an extended position whereby the sensor is exposed.
Figure 4:
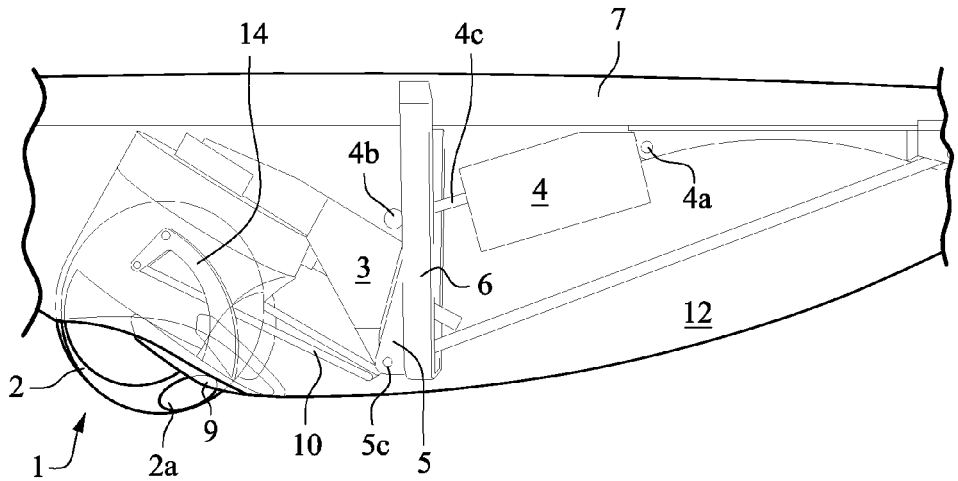
FIG. 4 is an exterior side view of the retractable system for aeronautical sensors according to an embodiment of the present invention in a retracted position.
Figure 5:
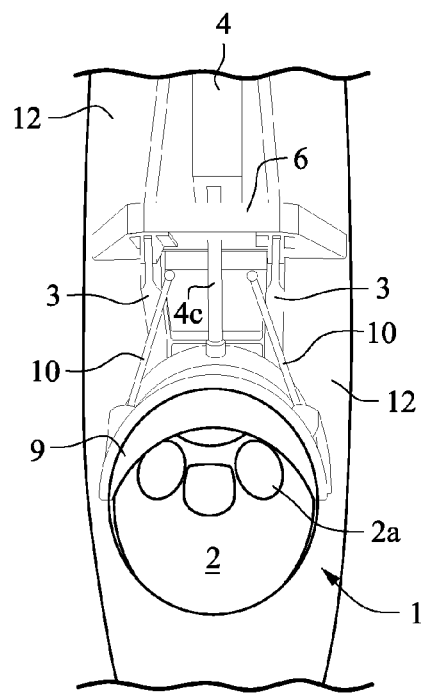
FIG. 5 is bottom plan view of the retractable system for aeronautical sensors according to an embodiment of the present invention in an extended position whereby the sensor is exposed.

The kinematics of the actuator 4 control movement of the sensor body 2 from the retracted condition thereof as shown in FIG. 2 to the extended (exposed) condition thereof as shown in FIG. 3. More specifically, extension of the piston rod 4c promotes a simultaneous angular movement of the sensor support structure 3 which thereby causes the sensor support structure 3 to pivot about a transverse rotation axis 5c to thereby move the sensor body 2 from its retracted position as shown in FIG. 2 and into its extended position as shown in FIG. 3. Angular movement of the sensor support structure 3 will in turn cause the door 9 to be raised upwardly into the fairing 11 by virtue of the interconnection between the sensor support structure 3 and the door 9 provided by the tie rods 10 and the hinges 14. Such a movement into the extended (exposed) condition therefore ensures that the EO/IR sensor 2a is positioned beyond the surface of the fairing 11 thereby providing an operational condition. In such an operational condition, the EO/IR sensor body 2 integrally fills the opening in the fairing 11, thus impeding the air flow to minimize the generation of improper vibrations to the other components comprising the retractable system 1.

The operation of the system 1 in order to retract the sensor body 2 from the extended position as shown in FIG. 3 to the retracted position as shown in FIG. 2 is accomplished by operation of the actuator 4 which causes the piston rod 4c to retract thereby counter-rotating the sensor support structure 3 about the pivot axis 5c. This angular movement in turn causes the sensor body 2 to rise into the fairing 11 while the door is caused to descend into a closed position by virtue of the interconnection between the sensor support structure 3 and the door 9 provided by the tie rods 10 and the hinges 14. In this closed condition, the door 9 is thus responsible for obstructing the existent openings between the EO/IR sensor body 2 and the opening of the fairing 11.

From the description above it is evident that the advantage of the present invention resides in the fact of providing a retractable system 1 capable of exposing and retracting the infrared optical sensor without the need of actuator devices and a door assembly which require voluminous protective fairings.

A small portion of the semi-spherical or ogival end of the sensor body 2 is maintained projected outside of the fairing. However, the influence of such protuberance in the generation of drag is minimal.

These advantages are of relevant importance from an economical and strategic point of view, because the useful life of the infrared optical sensor 2 and of the whole equipment is not only increased, the aircraft is allowed to perform efficiently during the execution of its missions.

It was described an example of favorite materialization of the invention, and it should be understood that the scope of the present invention includes other possible variations, such as employment of several types of radar and/or antennas, and it is only limited by the tenor of the attached claims, comprising its possible equivalents.

The invention claimed is:

1. A system for retracting and extending an airborne sensor assembly comprising:
    a sensor body containing an airborne sensor movable between retracted and extended positions thereof relative to a sensor bay;
    a bearing support defining a transverse articulation axis;
    a cantilevered sensor support structure having one end fixed to the sensor body and an opposite end connected to the bearing support at the transverse articulation axis thereof to allow for articulated movement of the sensor support structure between upper and lower positions thereof, wherein the cantilevered sensor support structure supports the sensor body for movement between the retracted and extended positions thereof in response to articulated movement of the cantilevered support structure between the upper and lower positions, respectively;
    a sensor bay door movable between lowered and raised positions and having an edge partially surrounding the sensor body when in the lowered position thereof;
    a linkage assembly operatively connecting the sensor bay door to the cantilevered sensor support structure for moving the sensor bay door between the lowered and raised positions thereof in response to the sensor support structure being moved between the upper and lower positions thereof, respectively; and
    an actuator assembly operatively connected to the sensor support assembly for moving the sensor support structure between the upper and lower positions thereof to thereby responsively cause the sensor body to move between the retracted and extended positions thereof and the sensor bay door to move between the lowered and lowered positions thereof, respectively, such that the sensor bay door is in the raised position thereof within the sensor bay when the sensor body is in the extended position thereof, and the sensor bay door is in the lowered position thereof with the edge at least partially surrounding the sensor body when the sensor body is in the retracted position thereof within the sensor bay.

2. The system of claim 1, wherein the linkage assembly comprises a hinge connected to the sensor bay door and a tie rod pivotally connected to the hinge at one end thereof and to the sensor support structure at an opposite end thereof.

3. The system of claim 1, wherein the actuator is comprises a piston and a piston rod having an end connected pivotally to the sensor support structure.

4. The system of claim 1, wherein the edge of the sensor bay door surrounds about one-half of the sensor bay body when in the retracted position thereof.

5. An aircraft comprising:

an airborne sensor assembly comprising a sensor body containing an airborne sensor;

a fuselage fairing defining a sensor bay for housing the airborne sensor assembly and a fairing opening to allow the sensor body to be moveably between a retracted position wherein the airborne sensor is positioned within the sensor bay and an extended position wherein the airborne sensor is positioned outside the sensor bay; and a system for retracting and extending the airborne sensor assembly relative to the sensor opening of the fairing, wherein the system includes:

(i) a bearing support fixed to the fuselage and defining a transverse articulation axis;

(ii) a cantilevered sensor support structure having one end fixed to the sensor body and an opposite end connected to the bearing support at the transverse articulation axis thereof to allow for articulated movement of the sensor support structure between upper and lower positions thereof, wherein the cantilevered sensor support structure supports the sensor body for movement between the retracted and extended positions thereof in response to articulated movement of the cantilevered support structure between the upper and lower positions, respectively;

(iii) a sensor bay door movable between lowered and raised positions relative to the fairing opening and having an edge partially surrounding the sensor body when in the lowered position thereof;

(iv) a linkage assembly operatively connecting the sensor bay door to the cantilevered sensor support structure for moving the sensor bay door between the lowered and raised positions thereof in response to the sensor support structure being moved between the upper and lower positions thereof, respectively; and (v) an actuator assembly operatively connected to the sensor support assembly for moving the sensor support structure between the upper and lower positions thereof to thereby responsively cause the sensor body to move between the retracted and extended positions thereof and the sensor bay door to move between the lowered and lowered positions thereof, respectively, such that the sensor bay door is in the raised position thereof within the sensor bay when the sensor body is in the extended position thereof, and the sensor bay door is in the lowered position thereof with the edge at least partially surrounding the sensor body when the sensor body is in the retracted position thereof within the sensor bay.

6. The aircraft of claim 5, wherein the linkage assembly comprises a hinge connected to the sensor bay door and a tie rod pivotally connected to the hinge at one end thereof and to the sensor support structure at an opposite end thereof.

7. The aircraft of claim 5, wherein the actuator is comprises a piston and a piston rod having an end connected pivotally to the sensor support structure.

8. The aircraft of claim 5, wherein the edge of the sensor bay door surrounds about one-half of the sensor bay body when in the retracted position thereof.

\* \* \* \* \*